Aug. 6, 1929.  H. D. STEVENS  1,723,386
COLLAPSIBLE CORE
Filed April 29, 1925  3 Sheets-Sheet 1
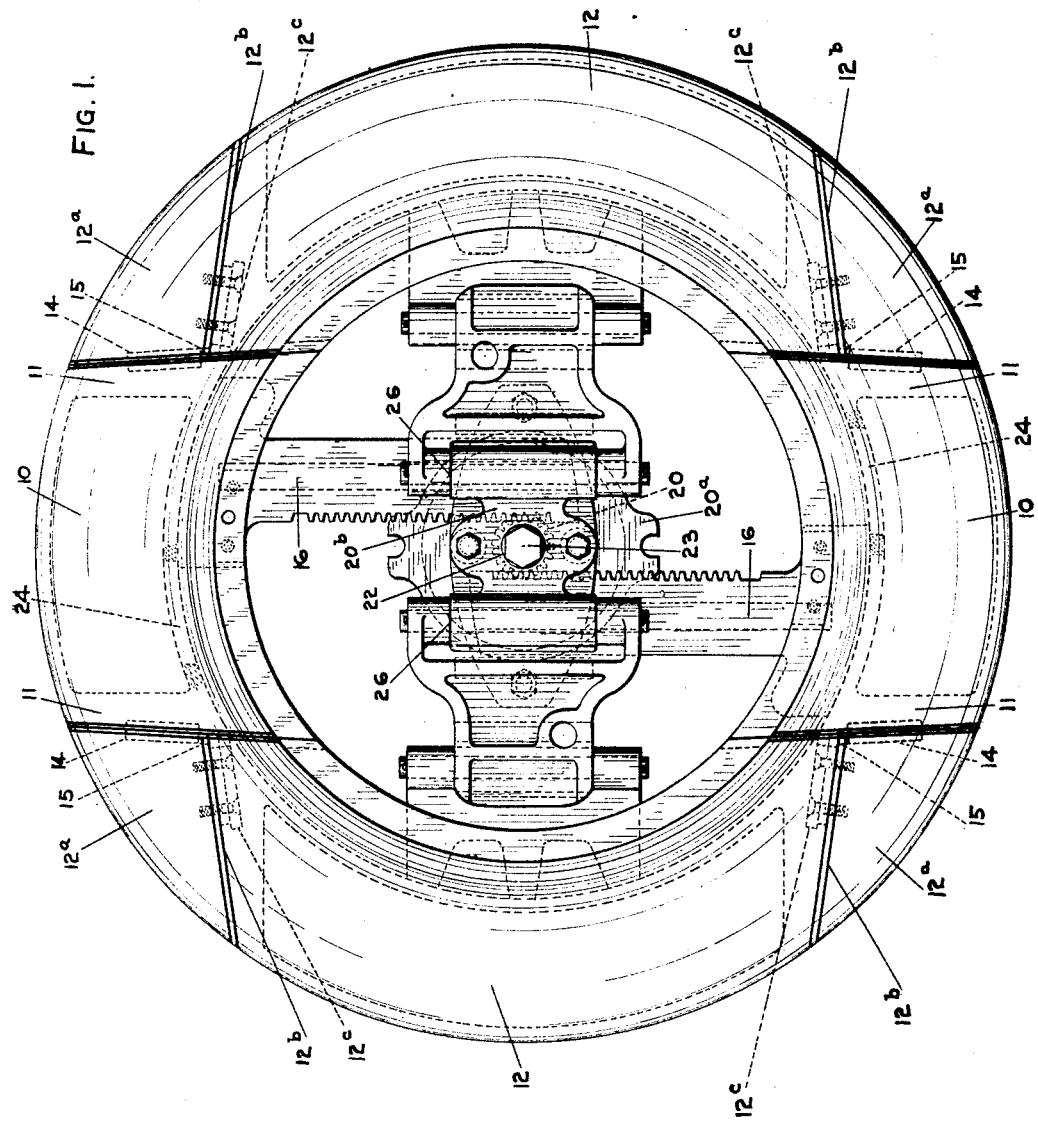
INVENTOR.
HORACE D. STEVENS
BY
ATTORNEY.

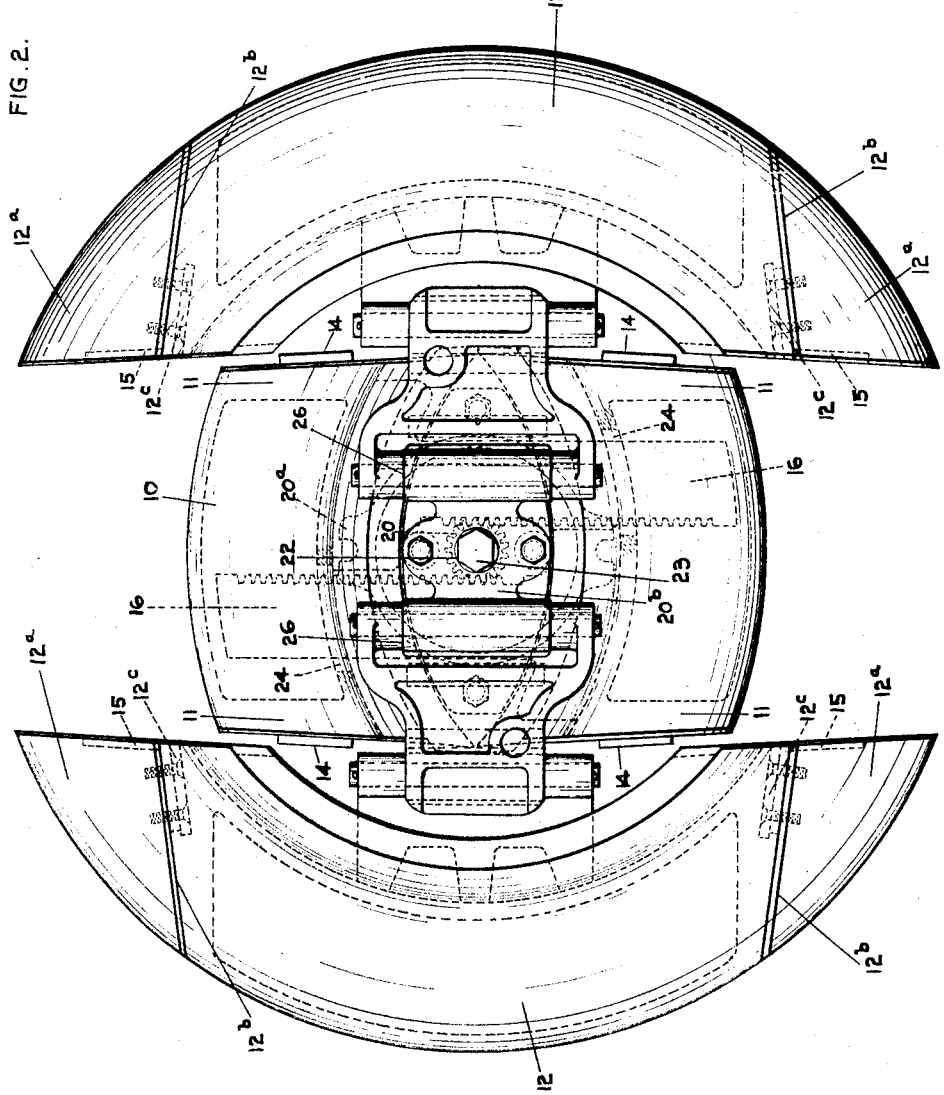

Aug. 6, 1929.　　　H. D. STEVENS　　　1,723,386
COLLAPSIBLE CORE
Filed April 29, 1925　　　3 Sheets-Sheet 3
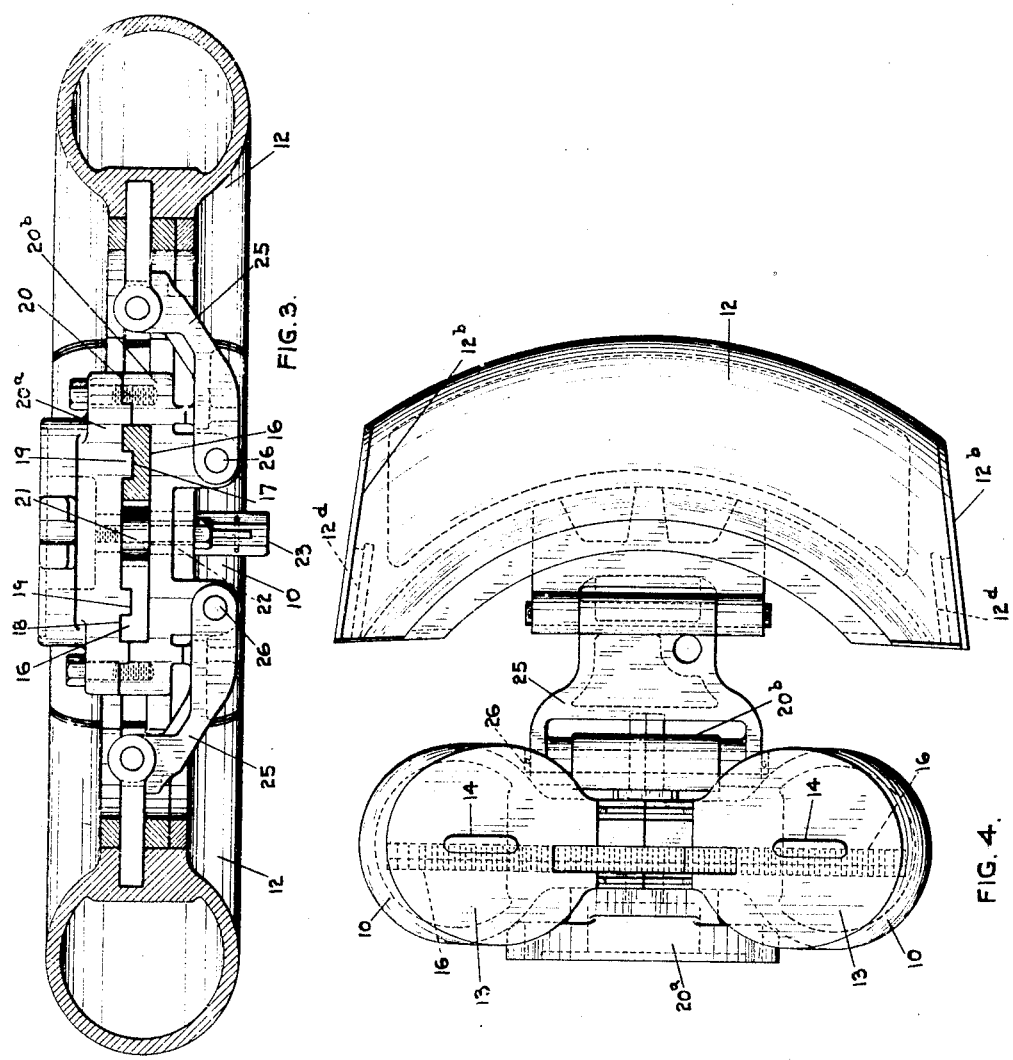
INVENTOR.
HORACE D. STEVENS
BY
ATTORNEY.

Patented Aug. 6, 1929.

1,723,386

UNITED STATES PATENT OFFICE.

HORACE D. STEVENS, OF AKRON, OHIO, ASSIGNOR TO THE FIRESTONE TIRE AND RUBBER COMPANY, OF AKRON, OHIO, A CORPORATION OF OHIO.

COLLAPSIBLE CORE.

Application filed April 29, 1925. Serial No. 26,615.

This invention relates to collapsible cores for use in the building of pneumatic tire casings.

The chief object of the invention is to provide an improved collapsible core construction in which a plurality of core sections are permanently connected together on a tire building machine and are adapted to be readily collapsed so that a completed tire casing may be removed and particularly the invention is directed toward the improvement of collapsible core structures whereby they will permit the ready removal of tires of large section, such as balloon tires, therefrom.

The above and other objects will become more readily apparent as the following description is read in connection with the accompanying drawings, it being understood that the invention is not limited by the specific form thereof shown and described.

Of the accompanying drawings;

Figure 1 is a front elevation of a core embodying the invention and shown in non-collapsed condition;

Figure 2 is a similar view showing the core partly collapsed;

Figure 3 is a sectional plan of the non-collapsed core; and

Figure 4 is a side elevation of the core when completely collapsed.

Referring to the drawings, the core comprises opposite key sections 10, 10 formed with ends 11, 11 which converge outwardly of the core to permit drawing of the sections inwardly from the core circle. Between the key sections 10 are opposite hinged sections 12, 12. The sections 12 are provided with ends 13, 13 adapted to mate with the ends 11, the latter being provided with keys 14 adapted to travel in keyways 15 formed in the ends 13.

The sections 10 are mounted on rack bars 16, 16 provided with grooves 17 by which they are arranged to slide in a slot 18 on ribs 19, 19 on a chuck 20, the latter being preferably formed in two parts 20$^a$ and 20$^b$, the former being secured on a drive shaft, (not shown) and the latter being bolted to the former to provide the slot 18. A gear 21 is rotatably mounted on the chuck 20 so as to rotate in slot 18 and to mesh with racks 16, 16 a suitable device for rotating said gear being provided by securing the same on a shaft 22 having a non-circular head 23 adapted to enter a corresponding socket in a suitable crank handle (not shown). All of the core sections are formed hollow so as to reduce expense and weight and core sections 10 are provided with apertures indicated at 24, 24 in line with the respective rack bars 16 whereby the latter may extend into the interior of the opposite sections 10 when the latter are drawn together as illustrated in Figure 2. Thus core sections 10 may be drawn inwardly into abutting relation to the bracket 20.

Core sections 12 are hinged onto links 25, 25 which are formed with portions so offset from the plane of the core that the links may in turn be hinged onto the outer portion of chuck section 20$^b$ as shown at 26, 26. Sections 12 are thus adapted to be swung out of the plane of the core into abutment with each other, as illustrated in Fig. 4 and if desired, to be further swung on the links 25 until the sections lie in abutting relation in parallel planes.

When the core is collapsed, the extremities of the sections 12 project outwardly of the center of the core beyond the sections 10 and especially when in use for building tires of large section, the tires are removed only with great difficulty by rocking them with a special tool over the projecting portions of these sections. Accordingly, each section 12 at either or both of its ends is provided with removable core pieces 12$^a$, 12$^a$ formed by cutting sections 12 as at 12$^b$, 12$^b$ which pieces 12$^a$ are arranged to slide on the body of sections 12 inwardly of the core by being provided with keys 12$^c$, 12$^c$ secured thereon and dovetailed in grooves 12$^d$, 12$^d$ formed on the body portions of sections 12.

In operation, the core being in the condition shown in Figure 1, plies of fabric, beads, etc., are applied thereto in the usual manner to form the carcass of a tire. When the tire is complete and ready for removal, a crank is applied to head 23 and rotated. This rotates gear 21 which operates racks 16 in opposite direction and draws sections 10 inwardly until they are stopped by the chuck 20, the racks 16 in the meantime enter the apertures 24 and when the sections 10 are completely withdrawn, the racks extend into the sections 10 as illustrated in Figure 2. Sections 12 are then swung on links 25 which permit the sections to swing while remaining in a plane parallel to the core so that the carcass supported thereon is drawn over the sections 20 and can then be drawn from the sections 12.

To withdraw the tire from sections 12, either the upper or lower or both pairs of core-pieces 12$^a$ may be removed, depending on the size of the tire. This may be accomplished by pushing or pulling the sections 12$^a$ one by one inwardly from the interior of the tire and laying them to one side. This will result in a fully collapsed core such as shown in Figure 4 from which a tire of large section may readily be removed.

To return the core to non-collapsed condition, core-pieces 12$^a$ are mounted on sections 12, as will be understood. The sections 12 are then swung back into the position shown in Figure 2 and gear 21 is rotated in the reverse direction to cause sections 10 again to take up their position in the core circle.

Modifications of the invention may be resorted to without departing from the spirit thereof or the scope of the appended claims. It will be evident that for use on certain sizes of tires it may be found advisable to provide a removable core piece only on one end of one section 12 or only one on each corresponding end of both sections 12.

What I claim is:

1. In a collapsible core construction, the combination of key sections, means for drawing said key sections toward and from the center of the core, and intermediate sections located between the key sections and having pivotal connections at the center of the core, said intermediate sections having separable removable end portions severed on a plane outwardly of the bead portion of the core.

2. In a collapsible core construction, the combination of key sections, means for drawing said key sections toward and from the center of the core, and intermediate sections located between the key sections and having pivotal connections at the center of the core, said intermediate sections each having a separable removable end portion on corresponding ends of the sections, said removable portions being slidable laterally of the core sections.

3. In a collapsible core construction, the combination of key sections, means for drawing said key sections toward and from the center of the core, and intermediate sections located between the key sections and having pivotal connections at the center of the core, one of said intermediate sections having a removable end portion laterally slidable with respect to the core section.

HORACE D. STEVENS.